United States Patent [19]

Asano

[11] Patent Number: 5,555,870
[45] Date of Patent: Sep. 17, 1996

[54] METHOD AND APPARATUS FOR SENSING AIR FLOW INTO A CYLINDER OF INTERNAL COMBUSTION ENGINE AND METHOD AND APPARATUS FOR CONTROLLING FUEL OF THE INTERNAL COMBUSTION ENGINE ARRANGED TO USE THE METHOD AND APPARATUS

[75] Inventor: Seiji Asano, Hitachinaka, Japan

[73] Assignee: Hitachi, Ltd., Japan

[21] Appl. No.: 425,687

[22] Filed: Apr. 19, 1995

[30] Foreign Application Priority Data

Apr. 20, 1994 [JP] Japan .................................. 6-081330

[51] Int. Cl.$^6$ .................................................. F02D 41/18
[52] U.S. Cl. ........................ 123/480; 73/118.2; 123/488
[58] Field of Search .................................. 123/480, 488, 123/494; 73/116, 118.2

[56] References Cited

U.S. PATENT DOCUMENTS

| 4,987,888 | 1/1991 | Funabashi et al. ................ 123/488 |
| 4,995,258 | 2/1991 | Frank .................................. 123/478 X |
| 4,999,781 | 3/1991 | Holl et al. ........................... 123/674 X |

FOREIGN PATENT DOCUMENTS

| 58-41230 | 3/1983 | Japan . |
| 5-240104 | 9/1993 | Japan . |

*Primary Examiner*—Tony M. Argenbright
*Attorney, Agent, or Firm*—Evenson, McKeown, Edwards & Lenahan, P.L.L.C.

[57] ABSTRACT

A method and an apparatus for sensing an air flow into a cylinder of an internal combustion engine are arranged to determine a number of revolutions of the engine, determine a pressure of an intake pipe of the engine, and calculate an air flow Qc into a cylinder of the engine, based on the number of revolutions and the pressure of the intake pipe by the linear expression of $Qc=\alpha P+\beta$, in which $\alpha$ is a coefficient indicating a gradient of a linear expression and defined according to the number of revolutions, $\beta$ is a coefficient indicating an offset value and defined according to the number of revolutions, and P is a pressure of the intake pipe. The method and the apparatus for controlling fuel of the internal combustion engine operate to generate a fuel flow signal according to the air flow into the cylinder determined by the above method and feed fuel to the internal combustion engine at a flow rate corresponding to a fuel flow signal.

28 Claims, 18 Drawing Sheets

Qt : THROTTLE AIR FLOW
Qc : AIR FLOW INTO CYLINDER
P : INTAKE PIPE PRESSURE

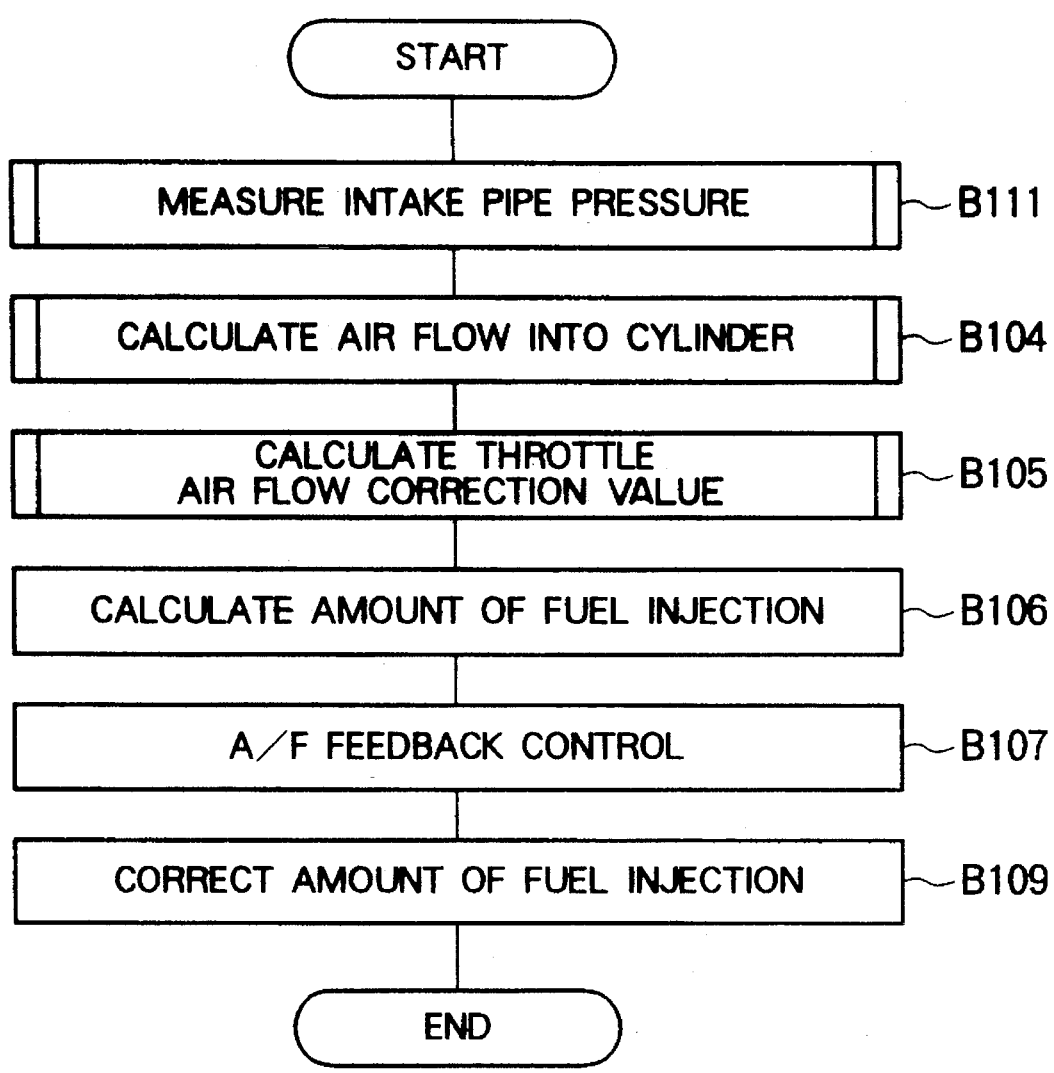

METHOD AND APPARATUS FOR SENSING AIR FLOW INTO A CYLINDER OF INTERNAL COMBUSTION ENGINE AND METHOD AND APPARATUS FOR CONTROLLING FUEL OF THE INTERNAL COMBUSTION ENGINE ARRANGED TO USE THE METHOD AND APPARATUS

BACKGROUND OF THE INVENTION

The present invention relates to a method and an apparatus for sensing an air flow into a cylinder of an internal combustion engine, and more particularly to a method and an apparatus for controlling fuel consumed in the internal combustion engine arranged to use the method for sensing the air flow into the cylinder.

It is known that the flow of air into an intake passage of the internal combustion engine does not completely coincide with the flow of air actually sucked into the cylinder. To accurately adjust an air/fuel ratio, the flow rate of the fuel to be fed to the internal combustion engine is required to be defined on the amount of air actually flown into the cylinder.

There has been known such a technique as preparing a two-dimensional map of correction values in a lot of operation areas defined by the parameter of engine speed and the negative pressure inside of the intake manifold, correcting a charging efficiency of an intake flow rate in each operation area with reference to the corrections read from the map, and determining a basic fuel injection amount based on the corrected intake air flow.

For example, the invention disclosed in Japanese Patent Application un-examined publication No. JP-A-58-41230 issued on Mar. 10, 1983 has proposed a technique arranged to determine the intake air flow on the basis of engine speed and the negative pressure of the intake pipe and, and then determine the fuel injection amount according to the value of intake air flow. The technique also has a step of correcting a volumetric efficiency of the engine based on a product of a correction value according to the intake negative pressure and a correction value according to the engine speed.

In addition, the invention disclosed in Japanese Patent Application un-examined publication No. JP-A-5-240104 issued on Sep. 17, 1993 has proposed a method for deriving an air flow into the cylinder based on the presumed value of the intake pipe pressure and engine speed.

However, the conventional fuel injection apparatus of the internal combustion engine disadvantageously needs a large storage capacity of a memory, because the corrections of the volumetric efficiency of the engine are required to be stored with respect to the axes of the negative pressure values and the engine speed values. Further, the prior art has another disadvantage that no consideration is taken about an adverse effect of an error resulting from a rebound of an output value of an air flow meter. This adverse effect takes place when the pressure of the intake pipe comes closer to the atmospheric pressure. This is because the pressure of the intake pipe is presumed from the intake air flow of the internal combustion engine sensed by a thermal type air flow meter. Hence, the prior art does not derive a precise air flow into the cylinder.

Further, that prior art uses an interpolation method for obtaining the correction values of the operation not shown in the map from the correction values of the operation area indicated in the map. In this case, the operation areas derived between two different operation areas appear as discontinuous areas. This indicates that the correction value derived by the interpolation may be erroneous.

SUMMARY OF THE INVENTION

It is an object of the present invention to provide an apparatus for controlling fuel of an internal combustion engine or sensing an intake air flow which apparatus has a reduced storage volume of a memory.

It is a further object of the present invention to provide a method and an apparatus for sensing a precise air flow into a cylinder of an internal combustion engine which method and apparatus eliminate the erroneous sensed value resulting from the adverse effect of the output characteristic of the thermal type air flow meter.

It is a yet further object of the present invention to provide a method and an apparatus for sensing a precise air flow of an internal combustion engine.

It is another object of the present invention to provide a method and an apparatus for controlling fuel of an internal combustion engine which method and apparatus enable to determine a precise fuel amount.

According to an aspect of the invention, the method takes the steps of sensing air flow passing through a throttle of the internal combustion engine and deriving the air flow into the cylinder from the pressure of an intake pipe and the engine speed presumed on the air flow at the throttle with respect to a linear expression. The throttle passage air flow is corrected on the pressure of the intake pipe. Or the air flow into the cylinder is derived based on the sensed pressure of the intake pipe and the sensed engine speed with respect to the linear expression. The linear derivation based on the pressure of the intake pipe and engine speed allows the necessary constants for the derivation to be offset with the gradient of the linear expression, thereby remarkably reducing the storage volume of the memory in comparison with that of the two-dimensional map. Further, since the air flow at the throttle is corrected by the presumed pressure of the intake pipe, the rebound output characteristic caused in the thermal type air flow meter may be corrected.

BRIEF DESCRIPTION OF THE DRAWINGS

FIG. 30 is a flowchart showing an operation of the embodiment shown in FIG. 29.

DESCRIPTION OF THE PREFERRED EMBODIMENTS

Later, the embodiments of the invention will be described with reference to the drawings.

Figure 1:
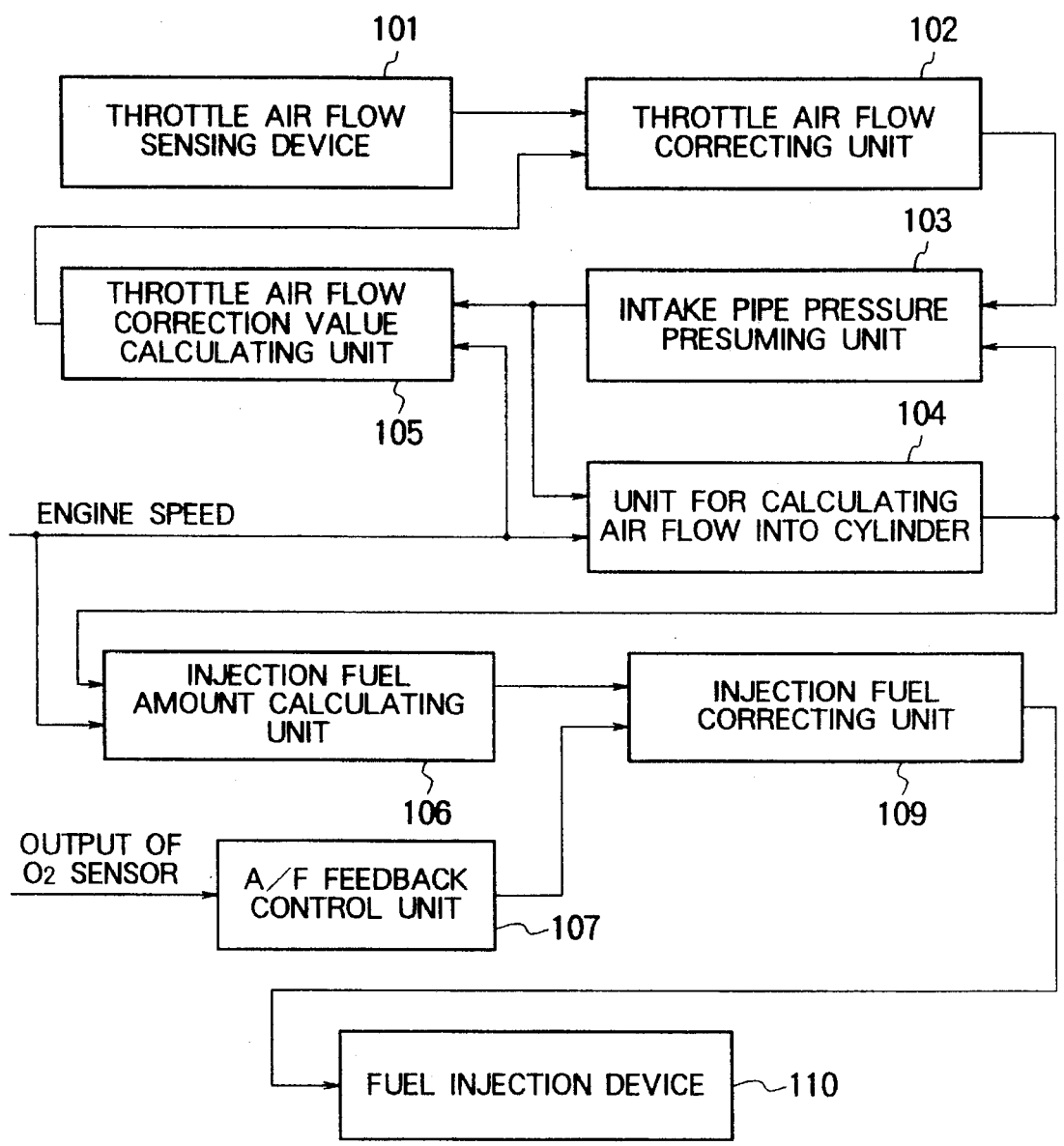
FIG. 1 is a block diagram showing an apparatus for controlling fuel according to an embodiment of the present invention.
Figure 2:
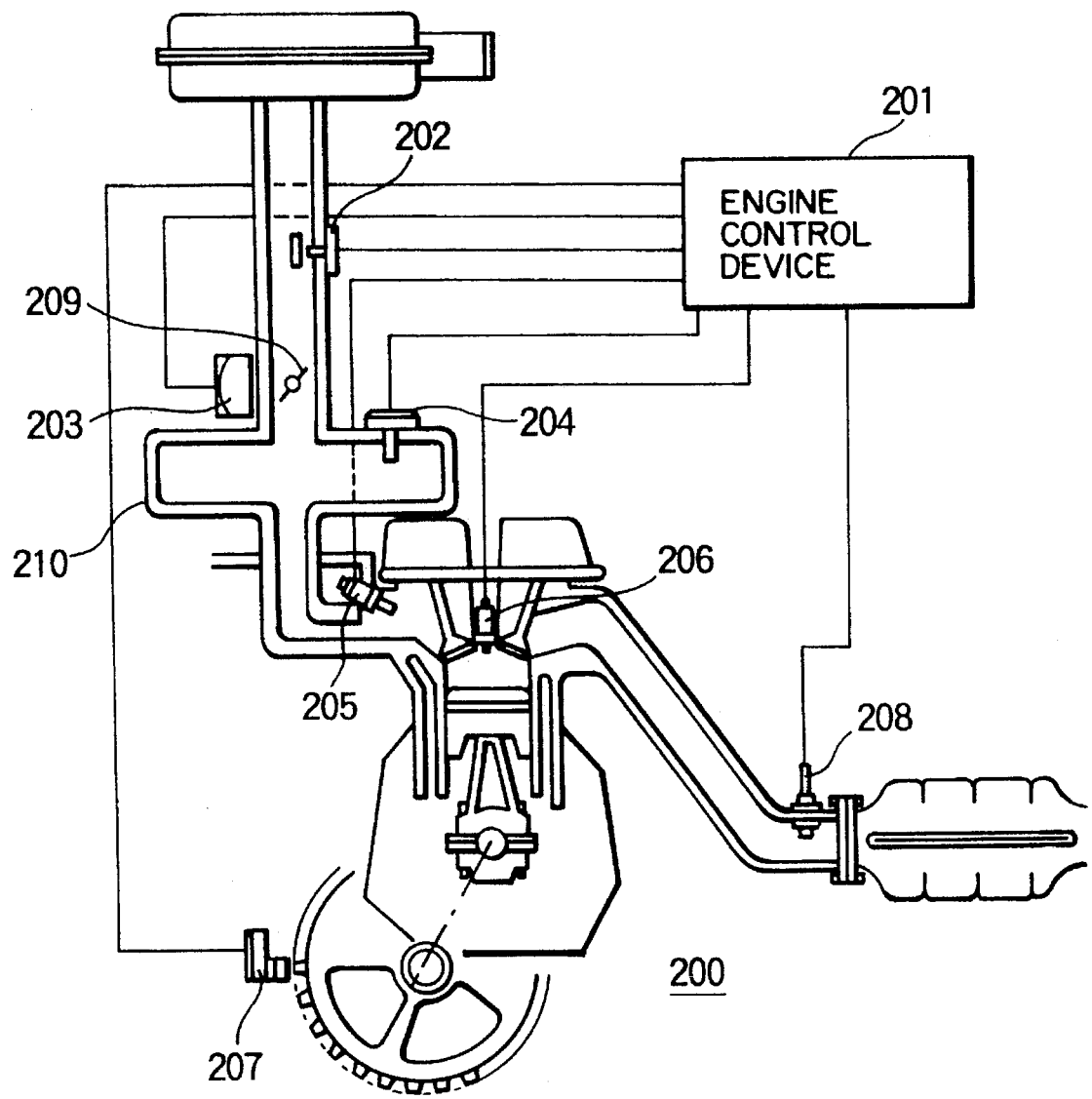
FIG. 2 is an explanatory view showing a system configuration located around an internal combustion engine to which the present invention applies.

FIG. 1 is a block diagram showing an embodiment of the present invention. FIG. 2 is a diagram showing an overall arrangement of a fuel control system for an internal combustion engine to which the present invention applies.

At first, as shown in FIG. 2, a numeral 200 denotes an internal combustion engine having an intake system. The intake system provides a throttle opening sensor 203 for sensing how much of degree a throttle valve 209 is opened. The throttle valve 209 is used for adjusting the flow of air to be sucked into the internal combustion engine 200. In the upstream of the sensor 203, a thermal type air flow meter (referred to as H/W (hot-wire) sensor) is provided for measuring the mass flow rate of air to be sucked therein to. Further, in a surge tank 210, a pressure sensor 204 is provided for sensing a pressure of the intake pipe.

Intake ports are located so that they are connected to the cylinders of the internal combustion engine 200, respectively. Each of the intake ports has a fuel injection valve 205 for injecting the amount of fuel required from the internal combustion engine. At the upper end of each cylinder is located an ignition plug 206 for igniting a mixture flown into the cylinder. And, near the output shaft of the internal combustion engine is provided a crank angle sensor 207 for sensing a crank angle of the internal combustion engine.

Further, in an exhaust pipe of the internal combustion engine 200 is located an oxygen density sensor (referred to as $O_2$ sensor) 208 for sensing an oxygen density in exhaust.

Each of those sensors issues a signal indicating the operating state of the internal combustion engine 200. Based on the stored programs, these signals are processed along a predetermined routine. At each data processing step, a control device 201 is provided for issuing a signal for driving an actuator such as the fuel injection valve 205.

Next, with reference to FIG. 1, the description will be oriented to an intake air flow sensor provided in the internal combustion engine. The sensor is composed of blocks 101 to 105.

In the illustrative block diagram, the engine speed signal produced by the crank angle sensor 207 and the output of the $O_2$ sensor 208 are applied into the block 107. The block 101 corresponds to a throttle air flow sensing unit (for example, H/W sensor 202) for sensing how much of air flow passes through a throttle 209. The block 102 corresponds to a throttle air flow correcting unit for correcting a throttle air flow sensed by the block 101. The block 103 corresponds to an intake pipe pressure presuming unit for presuming a pressure inside of the intake pipe from the throttle passage air flow and an air flow into the cylinder (to be described later). The block 104 corresponds to a cylinder air flow calculating unit for calculating an air flow into the cylinder from the presumed pressure of the intake pipe given by the block 103 and engine speed. The block 105 corresponds to a throttle air flow correction calculating unit for calculating a throttle air flow correction value from the presumed pressure of the intake pipe given by the block 103 and engine speed.

Next, the fuel system control device composed of blocks 106 to 110 will be described with reference to FIG. 1.

The block 106 corresponds to an injection fuel flow calculating unit for calculating the amount of the injection fuel required by the internal combustion engine from the air flow into the cylinder given by the block 104 and the engine speed. The block 107 corresponds to an air-fuel ratio control unit for calculating an air-fuel ratio feedback correcting coefficient from the output of the $O_2$ sensor 208, on which coefficient the air-fuel ratio of the mixture is kept as a stoichiometric air-fuel ratio. The block 109 corresponds to an injection fuel flow correcting unit for correcting the amount of fuel injection calculated by the block 106 based on the air-fuel ratio feedback correcting coefficient given by the block 107. The corrected amount of injection fuel is transmitted as an electric signal to the fuel injection unit corresponding to the block 110.

Figure 3:
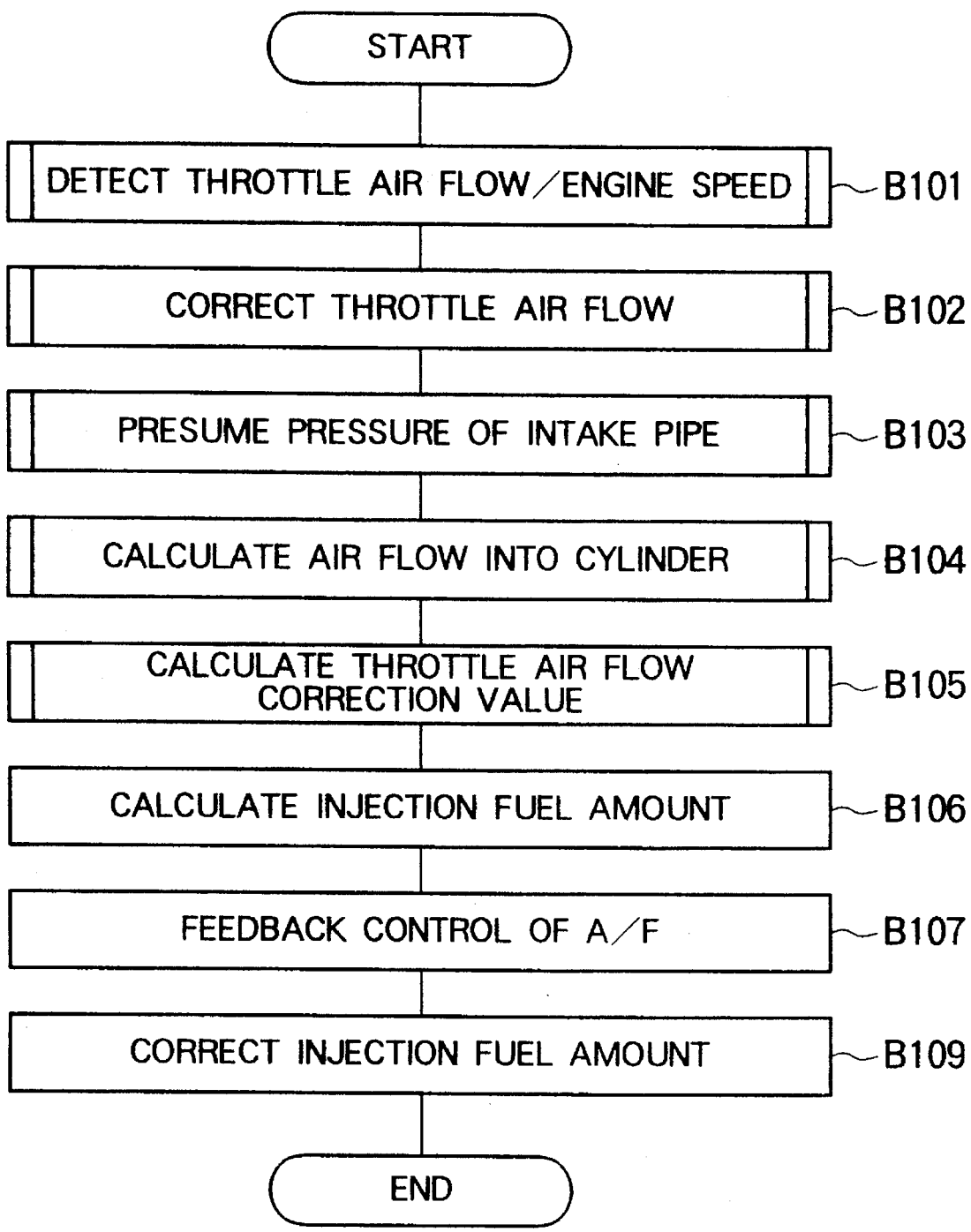
FIG. 3 is a general flowchart showing a control flow executed in the apparatus for controlling fuel of the internal combustion engine, the control flow corresponding to the block diagram of FIG. 1.

FIG. 3 is a flowchart showing a general control operation executed in the internal combustion engine control device 201. The flowchart corresponds to the system shown by the block diagram. At a step B101, the operation is executed to sense the throttle air flow and engine speed. At a step B102, the throttle air flow is corrected. At a step B103, the inside pressure of the intake pipe or intape manifold is presumed. At a step B104, the air flow into the cylinder is calculated. At a step B105, the correction of the throttle air flow is calculated. Next, at the steps B106, B107 and B109, the amount of injection fuel is calculated from the air flow into the cylinder. Then, the calculated amount is corrected by the air-fuel ratio feedback control.

Figure 4:
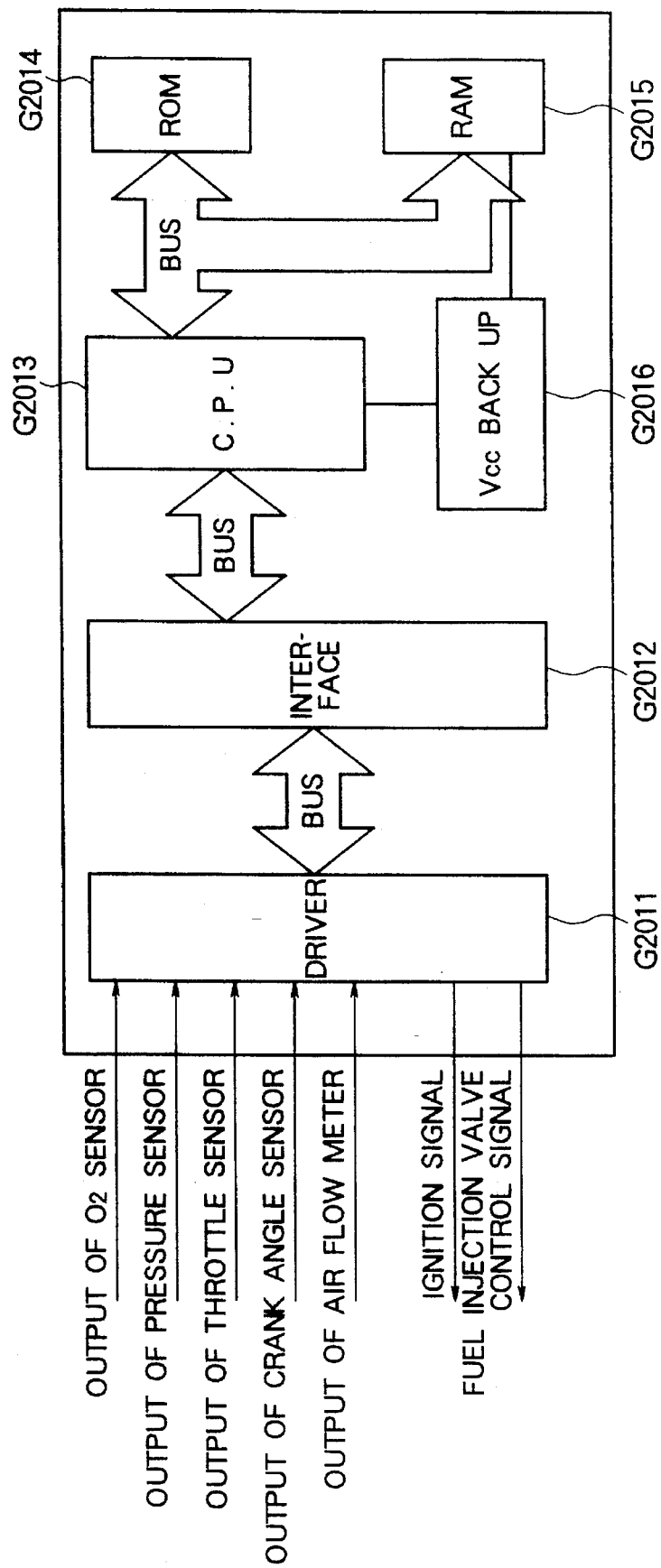
FIG. 4 is a block diagram showing an internal arrangement of an apparatus for controlling an internal combustion engine according to an embodiment of the present invention.

FIG. 4 is a circuit block diagram showing the inside circuit of the internal combustion engine control device 201. The control device 201 receives the signals from the sensors indicated in FIG. 2. The control device 201 is arranged to have a driver circuit G2011 for converting a small signal (TT level of the transistor) into higher voltage signal for driving the actuator, an I/O circuit (interface circuit) G2012 for converting the I/O signal into a digital signal, a microcomputer for performing a digital operation or an operating unit (CPU) G2013 having an operating circuit corresponding to the microcomputer, two kinds of memories, that is, a non-volatile ROM G2014 and a volatile RAM G2015 for storing constants, variables, data maps, data tables and programs to be used for the operation of the operating circuit G2013, and a back-up circuit G2016 for maintaining supply of a feeding voltage Vcc to the volatile RAM G2015 and holding the content of the RAM G 2015. In this embodiment, the signals from the $O_2$ sensor, the pressure sensor, the throttle aperture sensor, the crank angle sensor, and the H/W sensor are used as input signals to this control device 201. In response, the control unit 201 outputs an ignition signal and a fuel injection signal.

Figure 5:
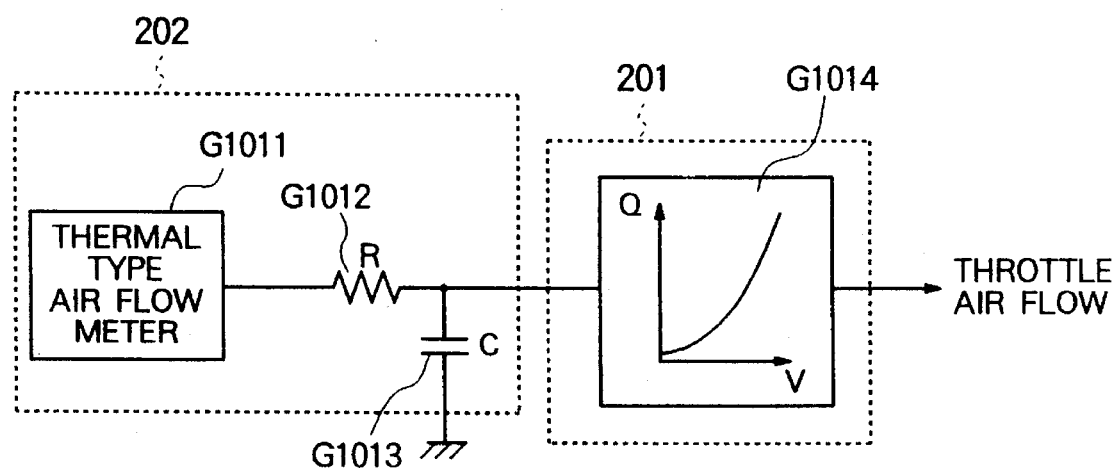
FIG. 5 is a view showing an arrangement of a sensor for a throttle air flow of FIG. 1.

FIG. 5 shows a concrete arrangement of the throttle air flow sensing unit 101 shown in FIG. 1. Concretely, the throttle air flow rate is measured by the H/W sensor 202. A filtering circuit composed of a resistor G1012 and a capacitor G1013 operates to remove electric noises from the voltage signal of the H/W sensor G1011 located in the intake pipe of the internal combustion engine 200. After the electric noises are removed, the voltage signal (V) output from the air flow meter is converted (V-Q conversion) into a flow rate signal (Q) in the block G1014 provided inside of the internal combustion engine control device 201. As a result, the throttle passage air flow Q is obtained. The conversion from the voltage to the flow rate signal executed in the block G1014 may refer to a map indicating a V-Q characteristic or may be obtained by the arithmetic expression representing the V-Q characteristic. At a step B1011, the output voltage V of the H/W sensor 202 is read. Then, at a step B1012, the voltage V is converted into a flow rate signal Q.

Figure 6:
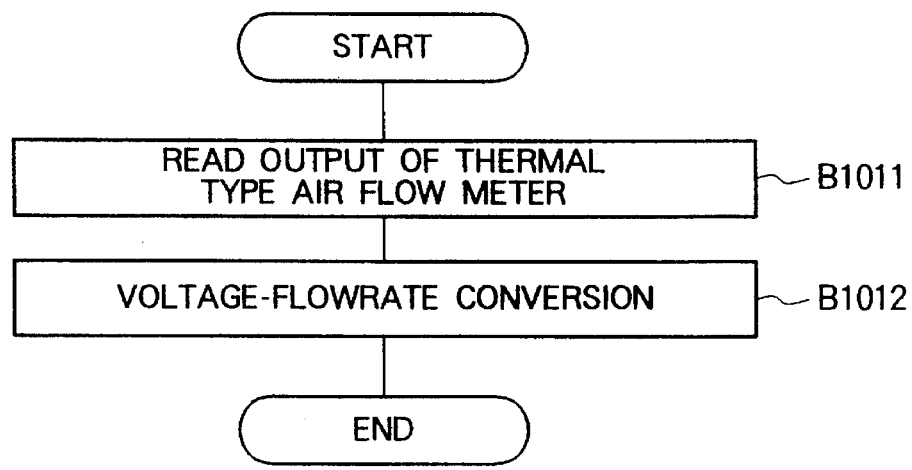
FIG. 6 is a flowchart showing the operation of the sensor shown in FIG. 5.

FIG. 6 is a flowchart showing the operation of sensing the throttle air. The operation is executed by a computer.

Figure 7:
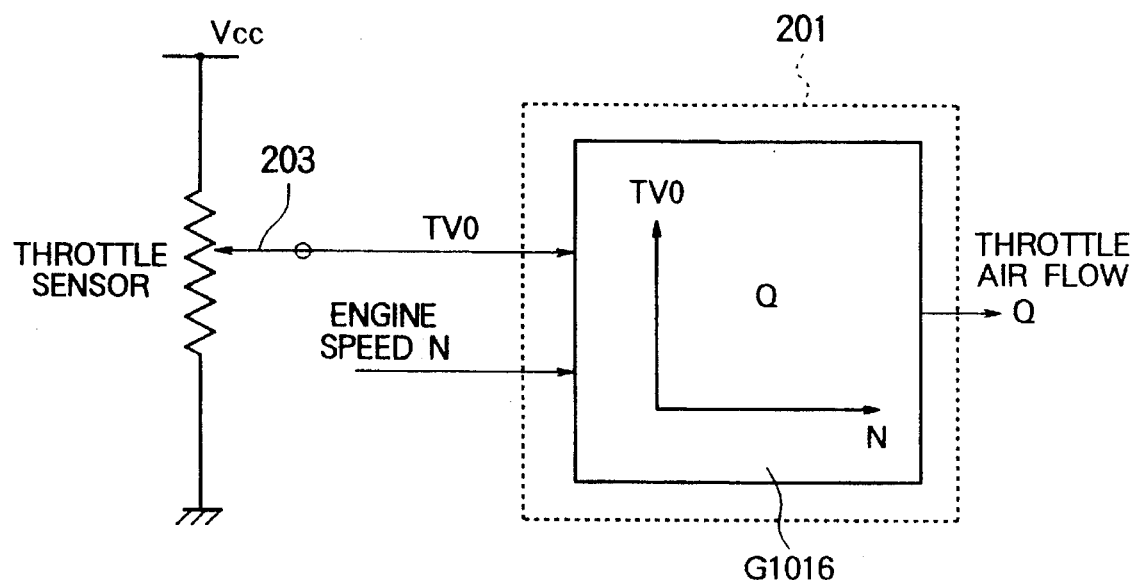
FIG. 7 is a view showing another arrangement of a sensor for a throttle air flow.
Figure 8:
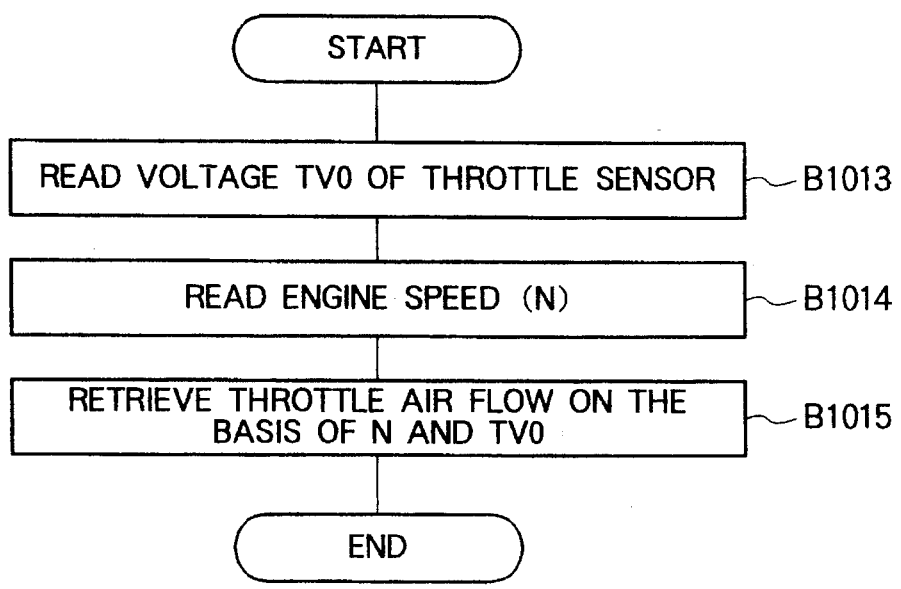
FIG. 8 is a flowchart showing the operation of the sensor shown in FIG. 7.

FIG. 7 shows another arrangement of the throttle air flow sensing unit shown in FIG. 1. At a block G1016, a throttle air flow Q is retrieved by referring to a map from an electric signal TVO given by the valve opening sensor 203 located at the throttle valve 209 of the intake pipe and a number N of engine speed. FIG. 8 is a flowchart showing the operation of sensing a throttle passage air flow. At a step B1013, a throttle opening TV0 is read. Then, at a step B1014, the engine speed N is read. At a step B015, the map G1016 is retrieved for deriving the air flow Q defined by the values of N and TVO.

Figure 9:
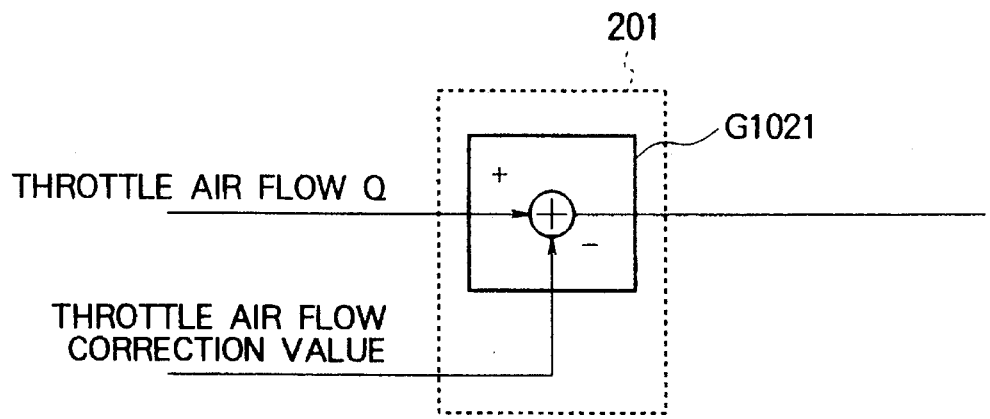
FIG. 9 is a diagram showing a unit for correcting a throttle air flow shown in FIG. 1.
Figure 10:
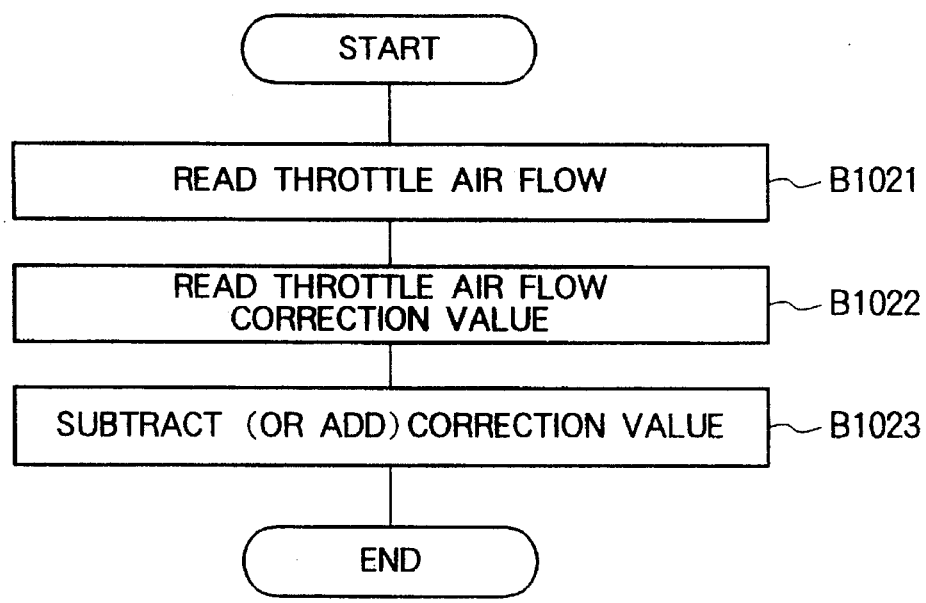
FIG. 10 is a flowchart showing the operation of the unit shown in FIG. 9.

FIG. 9 shows a concrete arrangement of the throttle air flow correcting unit shown in FIG. 1. At a block G1021, the operation is executed to subtract or correct the throttle air flow correction calculated by a throttle air flow correction calculating unit (to be described later) from the throttle air flow Q obtained at the block 101. FIG. 10 is a flowchart showing the operation of calculating the throttle air flow correction as shown in FIG. 9. At a step B1021, the throttle air flow Q is read. At a step B1022, the correction value is read. Then, at a step B1023, a correction value is subtracted from the throttle air flow.

Figure 11:
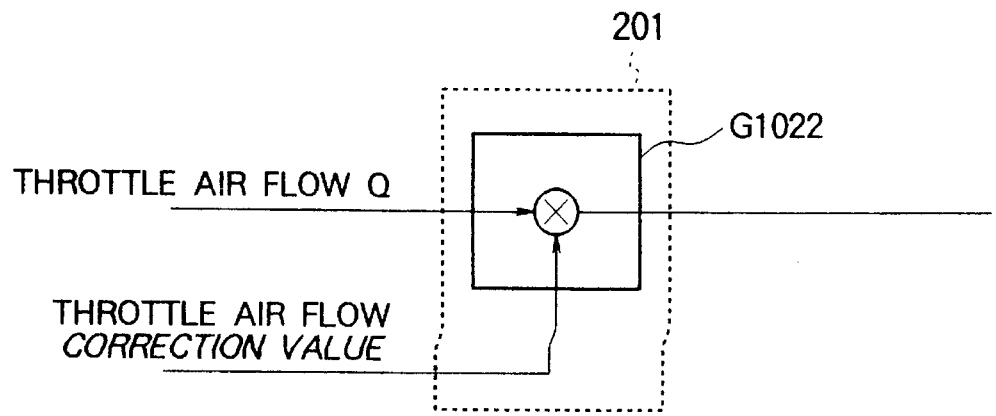
FIG. 11 is a diagram showing another arrangement of a unit for correcting a throttle air flow shown in FIG. 1.
Figure 12:
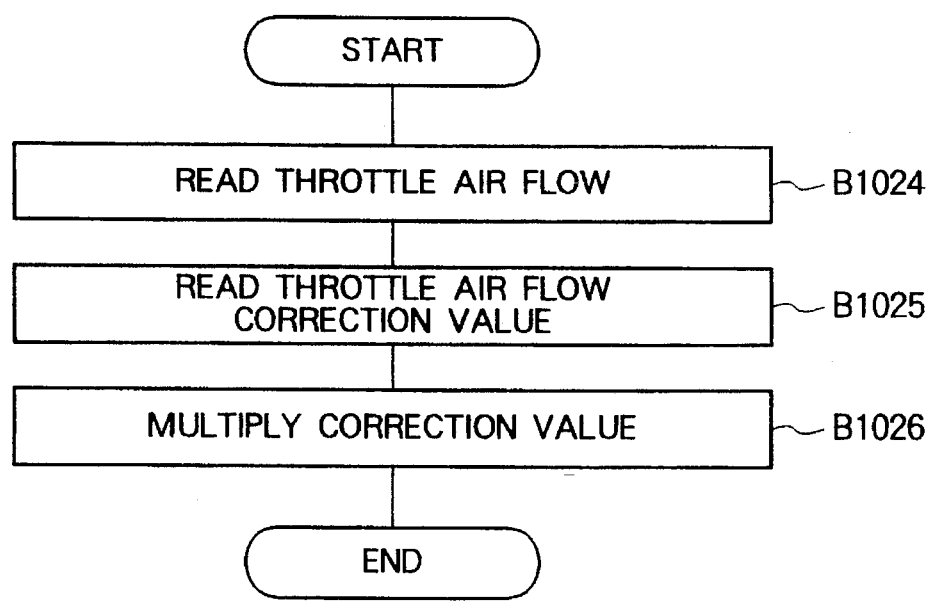
FIG. 12 is a flowchart showing an operation of the unit shown in FIG. 11.

FIG. 11 shows another arrangement in which the throttle air flow correction value is multiplied unlike the arrangement of FIG. 9 in which the correction value is subtracted. FIG. 12 is a flowchart showing the operation. At a step B1024, the throttle air flow Q is read. At a step B1025, the correction value is read. At a step B1026, a multiplier G1022 operates to multiply the throttle air flow Q by the correction.

Figure 13:
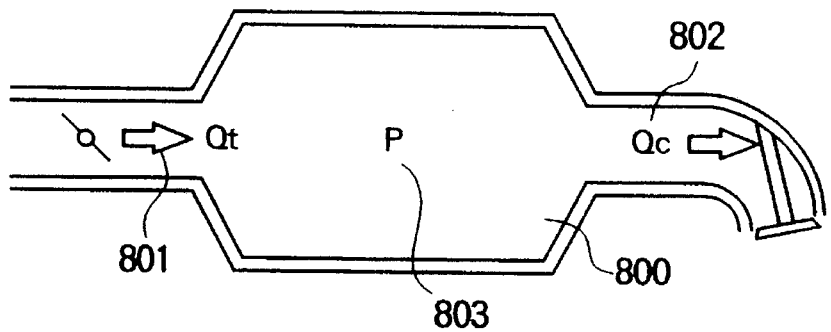
FIG. 13 is a model view showing an intake pipe of an internal combustion engine used in the invention.

FIG. 13 shows a simulating model of an intake pipe of the internal combustion engine. As the state quantity in the intake pipe 800, there are known a throttle air flow (Qt) 801, an air flow (Qc) 802 to be flown into the cylinder, and an internal pressure of the intake pipe (P) 803. These state quantities are known to have the following relations of 1 to 3.

$$d/dt\ P=K_1(Qt-Qc) \tag{1}$$

$$P_{(n)}=P_{(n-1)}+K_2(Qt-Qc) \tag{2}$$

$$K=RT\Delta t/MV \tag{3}$$

wherein R is a gas constant, T is an intake air temperature, M is an average quantity of molecules in the air, V is a volume of an intake pipe, $\Delta t$ is an operating period, and n (1, 2, 3, ..., n) is a sampling order.

The expression (1) indicates the proportional constant $K_1$ multiplied by a difference between the throttle air flow Qt and the air flow Qc is equivalent to a pressure gradient of the intake pipe. The expansion of the difference expression 1 leads to the expression 2. As indicated above, the air flow Qc keeps a linear form with the pressure of the intake pipe P(n). The proportional constant K is derived by the expression 3.

Figure 14:
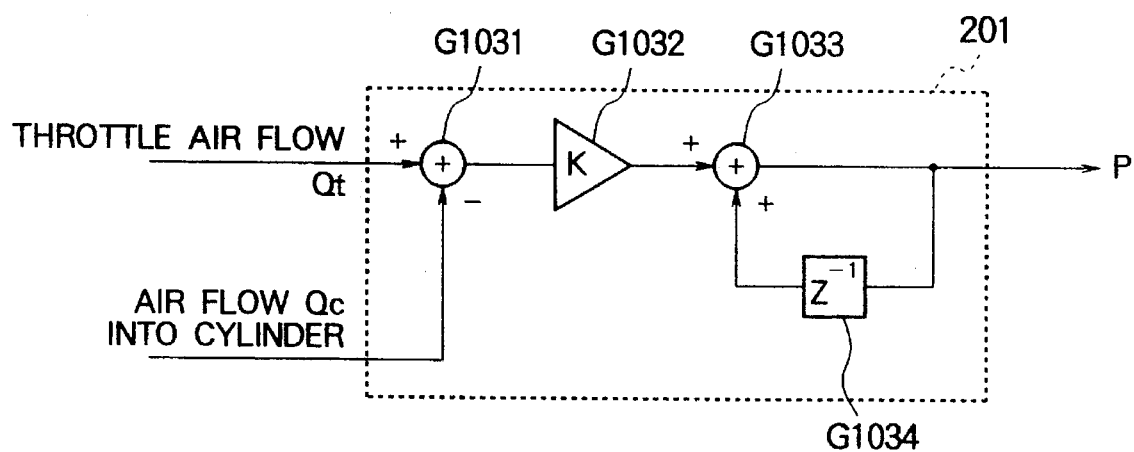
FIG. 14 is a block diagram showing a unit for presuming a pressure of an intake pipe provided in the apparatus for controlling the internal combustion engine shown in FIG. 1.
Figure 15:
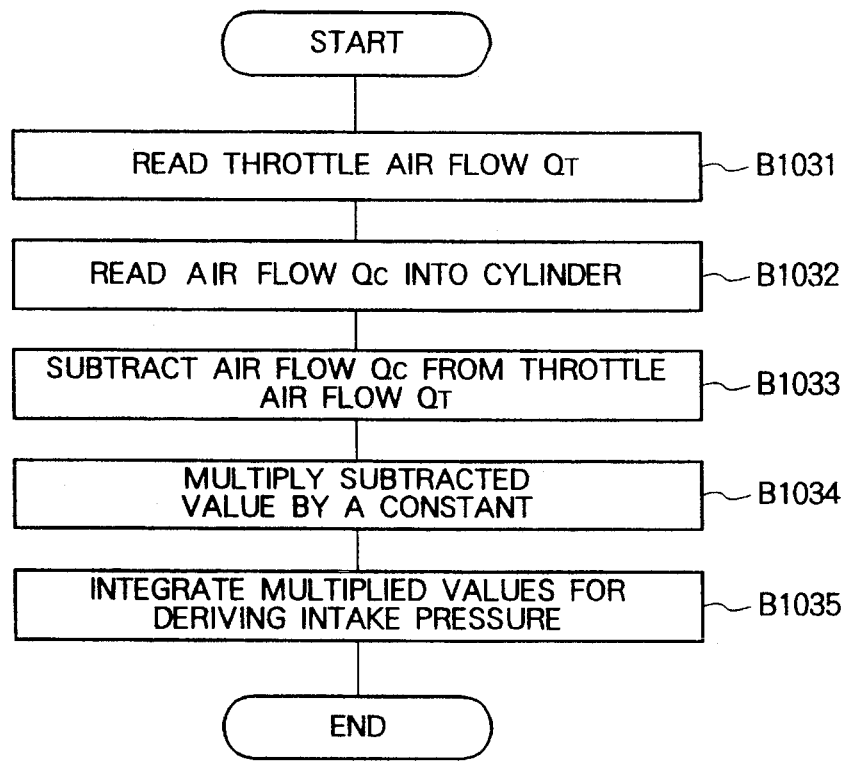
FIG. 15 is a flowchart showing an operation of the unit shown in FIG. 14.

FIG. 14 shows an arrangement of the intake pipe pressure presuming unit 103 included in the internal combustion engine control device 201. The presuming unit 103 performs the concrete calculation of the foregoing expression (2). At a step G1031, a difference Qt to Qc between the throttle air flow Qt and the air flow Qc is calculated. At a step G1032, the difference is multiplied by the proportional constant K. At the steps G1033 and G1034, the operation is executed to accumulate the current value of the difference Qt to Qc multiplied by the proportional constant K and the previous value for deriving the pressure P of the intake pipe. The pressure P derived as above is a presumed pressure of the intake pipe against the actual value measured by the pressure sensor 204. FIG. 15 is a flowchart showing the operation of presuming the pressure of the intake pipe shown in FIG. 14. The operation is executed by the computer. At a step B1031, the throttle air flow Qt is read. Then, at a step 1032, the air flow Qc is read. How to obtain the air flow Qc will be described later. At a step B1033, the difference Qt–Qc will be calculated. At a step 1034, the difference Qt–Qc is multiplied by the constant K. At a step 1035, the previous and the current values of (Qt–Qc)K are added.

Figure 16:
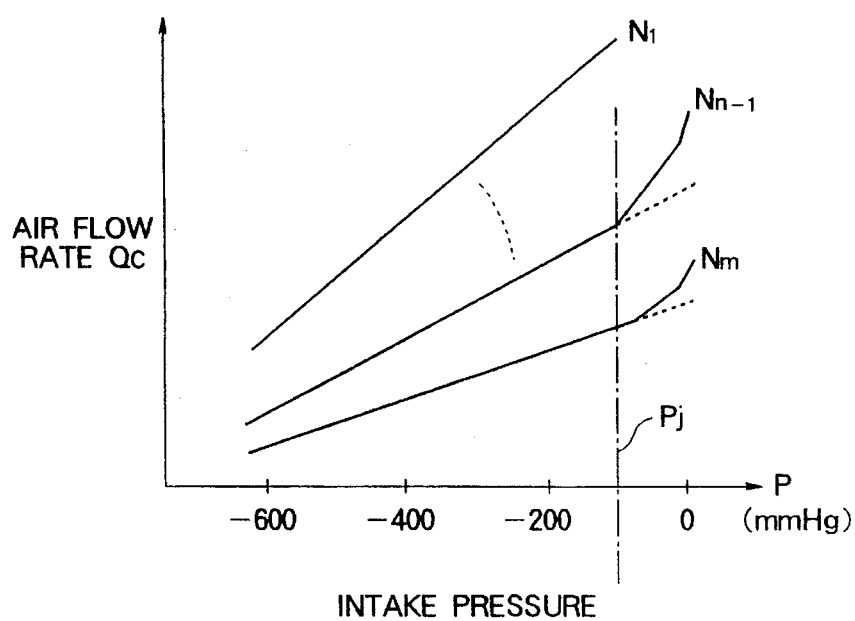
FIG. 16 is a view showing a relation between a pressure of the intake pipe and the air flow into the cylinder at each engine speed.

FIG. 16 shows a relation between the pressure P of the intake pipe and the air flow Qc at each of engine speeds $N_1$ to $N_n$ of any internal combustion engine. The relation is plotted with the actual data. As will be understood from FIG. 16, at the constant engine speed, the pressure P of the intake pipe is proportional to the air flow Qc. In this example, however, the air flow Qc is measured by the H/W sensor 202. Hence, if the pressure P reaches a certain pressure Pj or more, the larger measured value than the actually flown air is output. This is called an output rebound.

Figure 17:
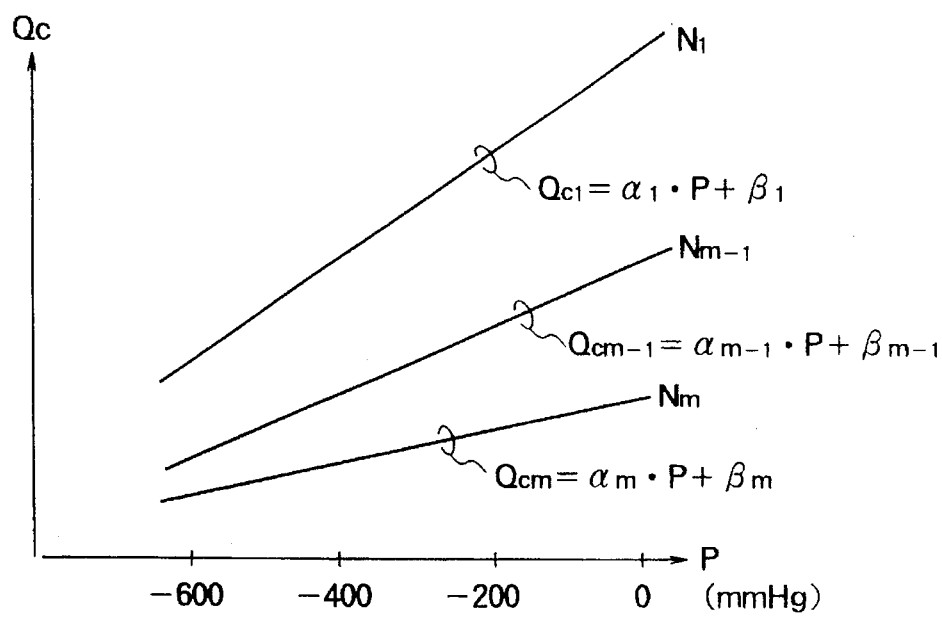
FIG. 17 is a view showing a relation between a pressure of the intake pipe and the air flow into the cylinder at each engine speed.

The graph of FIG. 17 is depicted by directly extending the line portion of the characteristic of FIG. 16 after Pj, approximating a relation between the pressure P of the intake pipe and the air flow Qc into the cylinder at each of the engine speeds $N_1$ to $N_{m+1}$ and $N_m$ (m=1, 2, 3), and representing each approximating curve in the below-described line form 4. It is understood from FIG. 17 that these approximations may be represented by a linear expression at each of engine speeds $N_1$ to $N_m$.

$$Qc_m = \alpha_m P + \beta_m \quad (Qc = \alpha P + \beta) \quad (4)$$

wherein a subscript m represents a value at any one of the engine speeds $N_m$.

The expression (4) is generally represented by $Qc=\alpha P+\beta$. The air flow Qc is represented by the line with the gradient $\alpha$ and an offset value $\beta$.

Figure 18:
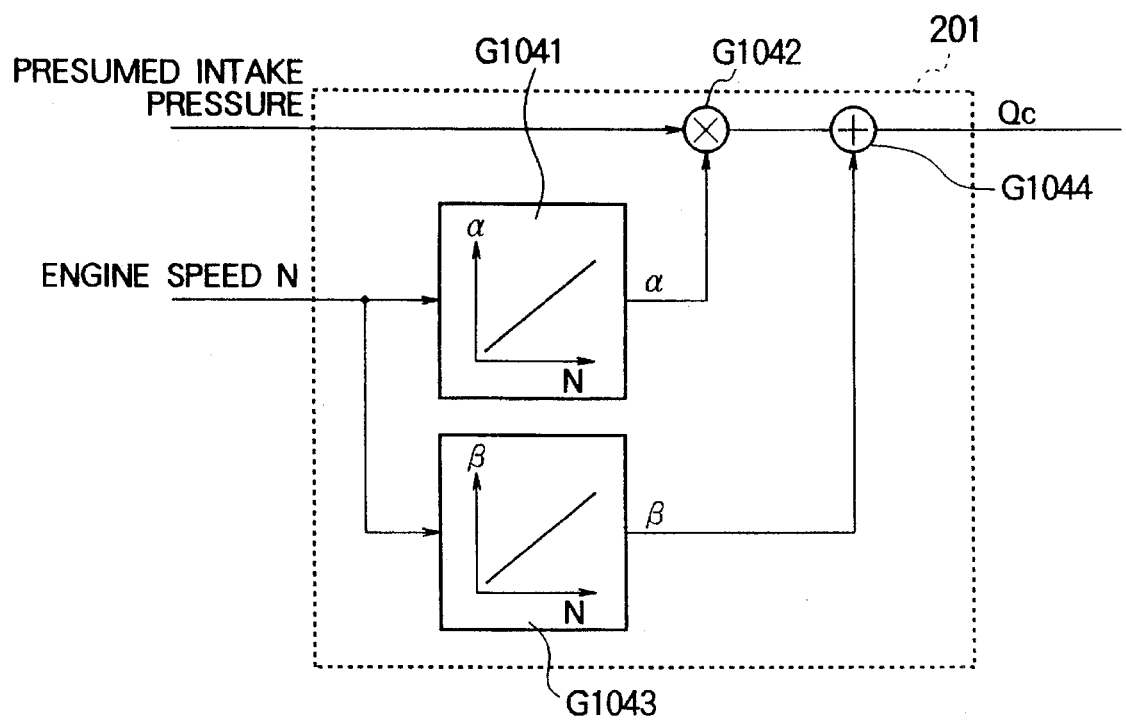
FIG. 18 is a block diagram showing a unit for deriving an air flow into the cylinder in the apparatus for controlling the internal combustion engine shown in FIG. 1.
Figure 19:
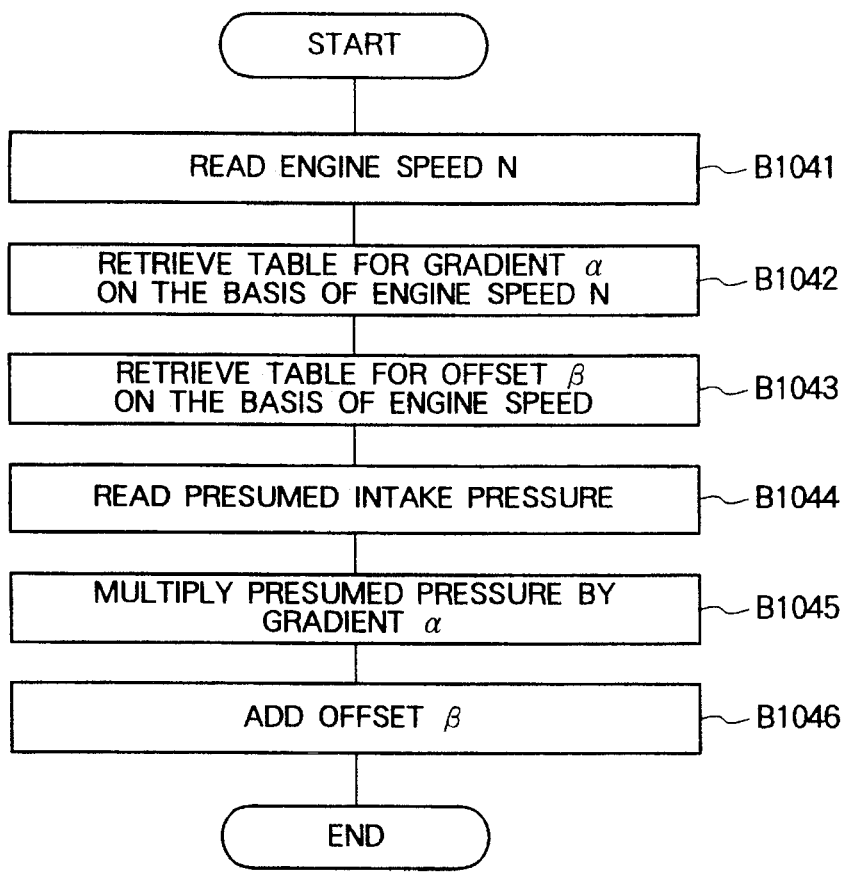
FIG. 19 is a flowchart showing an operation of the unit shown in FIG. 18.

FIG. 18 shows a concrete arrangement of an air flow calculating unit 104 for calculating air flow according to the expressions of FIG. 17. A block G1041 operates to retrieve the table for the gradient $\alpha$ from the engine speed N. The gradient $\alpha$ is multiplied by the presumed pressure of the intake pipe in the block G1042. Like the block G1041, the block G1043 operates to retrieve the table for the offset $\beta$ from the engine speed N. In the block G1044, the offset $\beta$ is added to the multiplied value for deriving the air flow Qc into the cylinder. FIG. 19 is a flowchart representing the process for calculating the air flow shown in FIG. 18. The process is executed by the microcomputer. In the flowchart, at a step B1041, the engine speed N is read. Then, at a step B1042, the gradient $\alpha$ is read from the table G1041. Going to a step B1043, the offset value $\beta$ is read from the table G1043. At a step B1044, the presumed pressure P of the intake pipe E is read. Next, at steps B1045 and B1046, the air flow Qc into the cylinder is calculated. The air flow calculating unit 104 operates to linearly calculate an air flow into the cylinder of the internal combustion engine 200. The blocks G1041 and G1043 are tables for indicating the gradient $\alpha$ and the offset value $\beta$ for the engine speeds respectively. These tables are stored in the ROM G2014, for example.

Figure 20:
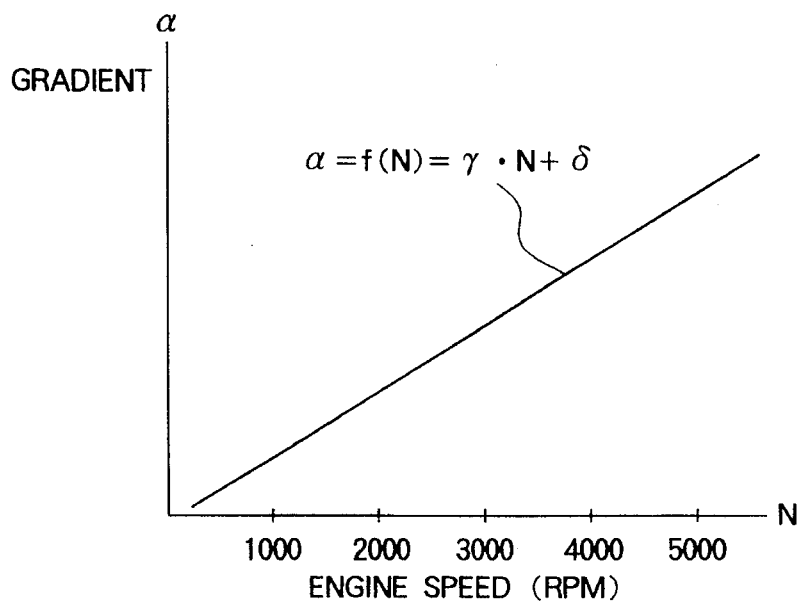
FIG. 20 is a view representing a relation between the engine speeds and a gradient of a linear expression of air flow into the cylinder.
Figure 21:
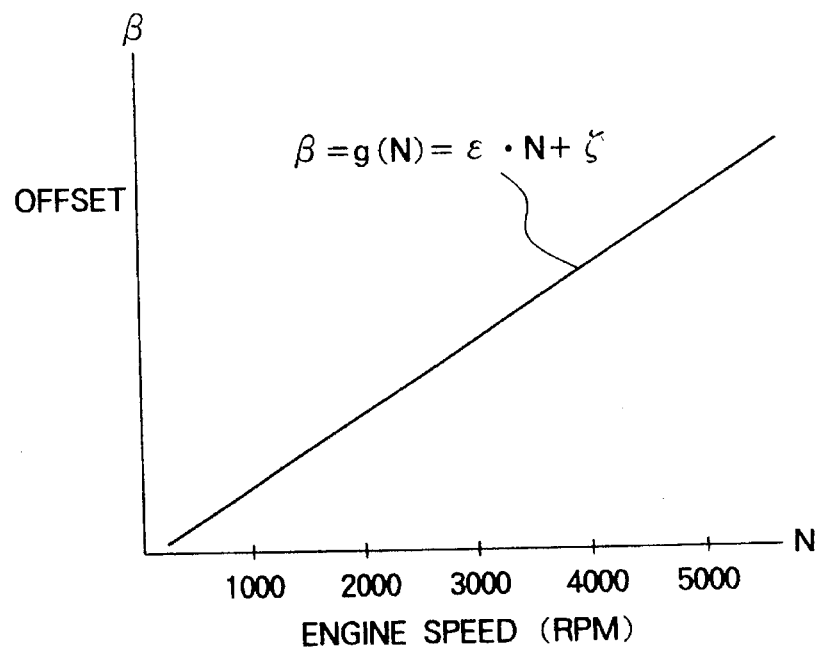
FIG. 21 is a view representing an offsetting relation between the engine speeds and a linear expression of air flow into the cylinder.

FIG. 20 is a graph in which a relation between the gradient $\alpha$ and the engine speeds N is represented by a linear function. FIG. 21 is a graph in which a relation between the offset $\beta$ and the engine speeds N is represented by a linear function. As is understood from FIGS. 20 and 21, the gradient $\alpha$ and the offset $\beta$ are both represented by the linear functions being proportional to the engine speeds N of the internal combustion engine. These linear functions are represented by the following expressions (5) and (6). Hence, the gradient $\alpha$ and the offset $\beta$ are obtained from the corresponding linear equations if the engine speed N is given.

$$\alpha = f(N) = \gamma N + \delta \quad (5)$$

$$\beta = g(N) = \epsilon N + \zeta \quad (6)$$

wherein $\alpha$ denotes a gradient, $\gamma$ denotes a first gradient, $\gamma$ denotes a first offset, $\beta$ denotes an offset, $\epsilon$ denotes a second gradient, and $\zeta$ denotes a second offset.

Figure 22:
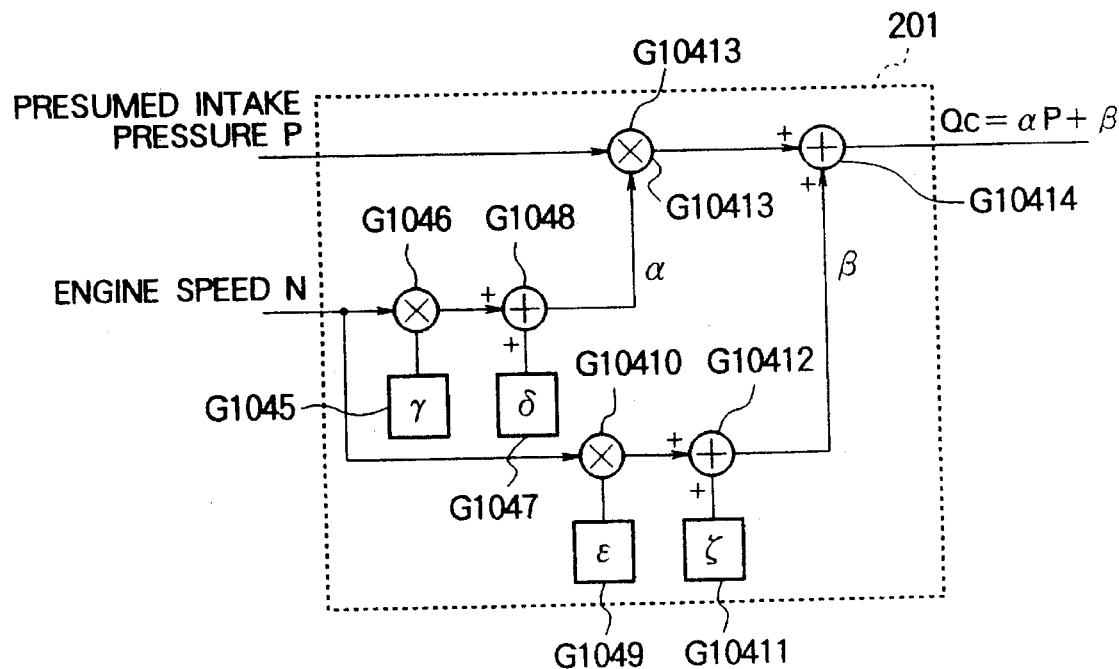
FIG. 22 is a block diagram showing another arrangement of a unit for deriving air flow into the cylinder shown in FIG. 1.
Figure 23:
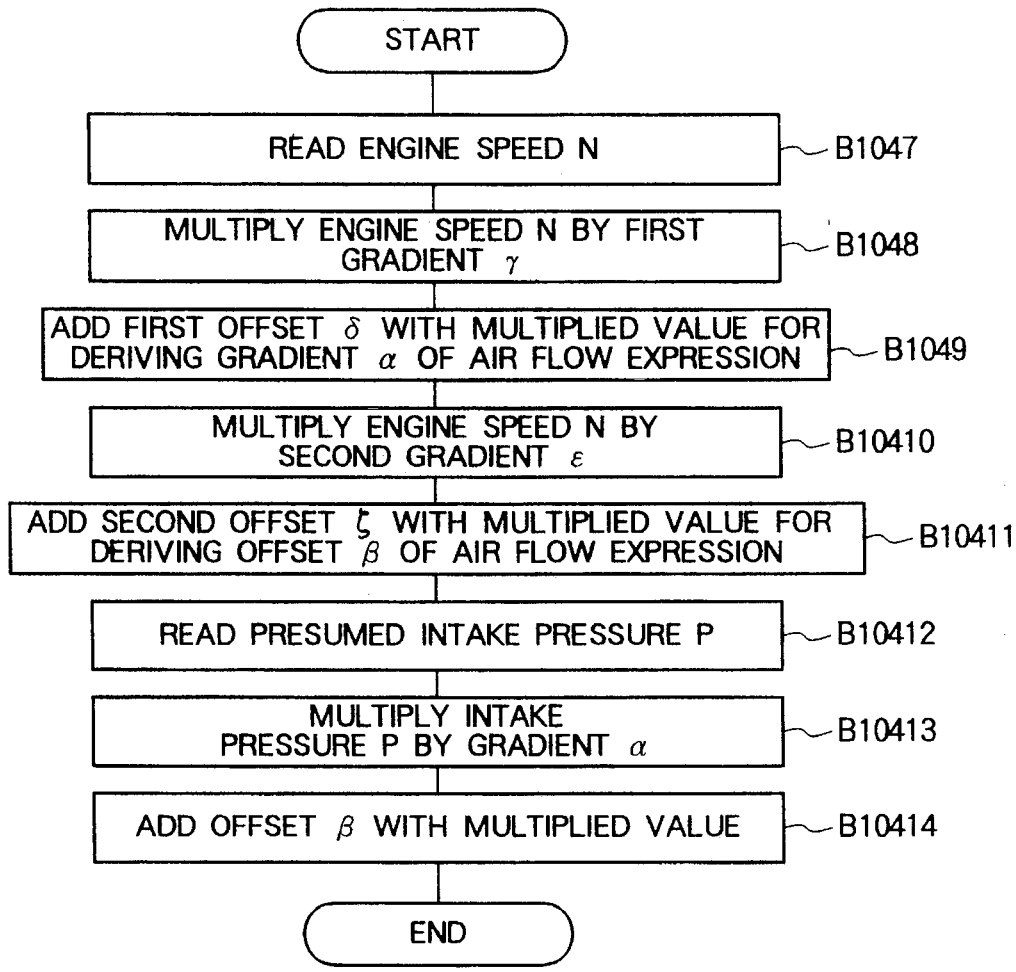
FIG. 23 is a flowchart showing an operation of the unit shown in FIG. 22.

FIG. 22 shows a concrete arrangement of the air flow calculating unit 104 for calculating a concrete air flow in the internal combustion control device 201. The calculation is done according to the expressions (4), (5) and (6). In the control device 201, a block G1046 operates to multiply the engine speed N by the first gradient. A block G1048 operates to add the first offset value $\delta$ to the output of the block G1046. The added result is made to be the gradient $\alpha$ of the air flow Qc to the cylinder. Then, a block G10410 operates to multiply the engine speed N by the second gradient $\epsilon$. A block G10412 operates to add the second offset value $\zeta$ to the output of the block G10410. The added result is made to be the offset $\beta$ of the air flow Qc into the cylinder. And, a block G10413 operates to multiply the gradient $\alpha$ of the calculated air flow Ac by the presumed pressure P of the intake pipe. A block G10414 operates to add this multiplied value $\alpha P$ by the offset $\beta$ of the air flow Qc for deriving the air flow Qc. The blocks G1045, G1047, G1049 and G10411 are memories for storing the tables indicating the values of $\gamma$, $\delta$, $\epsilon$ and $\zeta$, respectively. FIG. 23 is a flowchart showing the process for calculating the air flow. The process is shown in FIG. 22 and is executed by the microcomputer.

In the flowchart of FIG. 23, at a step B1047, the engine speed N is read. At a step B1048, the engine speed N is multiplied by the first gradient $\gamma$ read from the table G1045. At a step B1049, the first offset value $\delta$ read from the table G1047 is added to $\gamma N$ for deriving the gradient $\alpha$ of the linear equation representing the air flow Qc. At a step B10410, the engine speed N is multiplied by the second gradient $\epsilon$ read from the table G4049. At a step B10411, $\epsilon N$ is added to the second offset value $\zeta$ read from the table G10411 for deriving the offset $\beta$ of the linear function representing the air flow Qc. At a step B10412, the presumed pressure P of the intake pipe is read. Then, at a step B10413, the presumed pressure P of the intake pipe is multiplied by the gradient $\alpha$. At a step B10414, $\beta$ is added to $\alpha P$ for deriving the air flow Qc. The memory area for data required for this calculation needs to be large enough to just store the constant values of $\gamma$, $\delta$, $\epsilon$ and $\zeta$.

Figure 24:
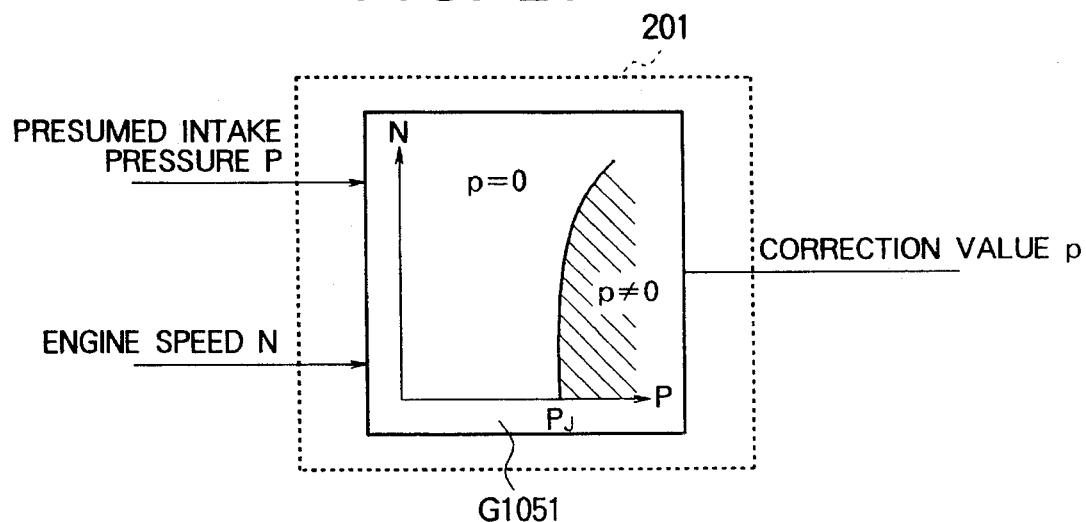
FIG. 24 is a block diagram showing a unit for deriving a correction of a throttle air flow.

FIG. 24 shows a concrete arrangement of a throttle air flow correction calculating unit 105 shown in FIG. 1. In this arrangement, a block G1051 includes a map indicating a value of a throttle air flow correction values p against the pressures P of the intake pipe and the engine speed N. This map is stored in the memory. The map shown in FIG. 24 indicates that the output characteristic of the HW sensor 202 is linear in the area of p=0. The area of p=0 corresponds to the area where no correction is required, that is, the area of P<Pj in the characteristic of FIG. 16. In this map, the area of p≠0 indicated by hatching corresponds to the area of P>Pj in the characteristic shown in FIG. 16, in which the rebound characteristic appears. As shown in FIGS. 9 and 10, in this area, the correction value p indicated in the map is subtracted from the throttle passage air flow measured by the HW sensor 202. Alternatively, as shown in FIGS. 11 and 12, the correction value p indicated in the map may be multiplied by the throttle air flow measured by the HW sensor 202 for correcting the air flow.

Figure 25:
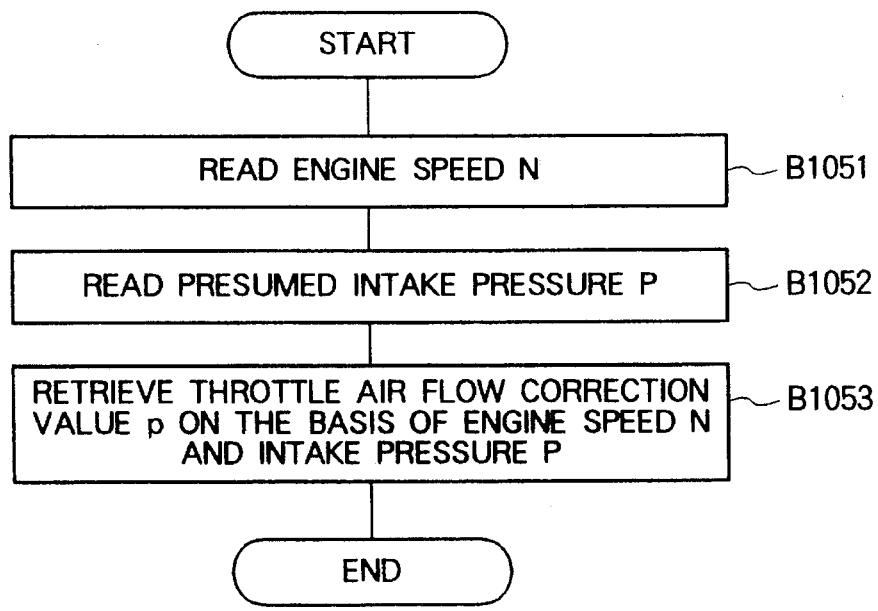
FIG. 25 is a flowchart showing the unit shown in FIG. 24.

FIG. 25 is a flowchart showing the process for deriving a throttle air flow correction value p shown in FIG. 24, the process being executed by the microcomputer. At a step B1051, the number of revolutions N is read. Then, at a step B1052, the presumed pressure P of the intake pipe is read. At a step B1053, the map is retrieved with reference to the engine speed N and the pressure P of the intake pipe, for reading the correction value p.

Figure 26:
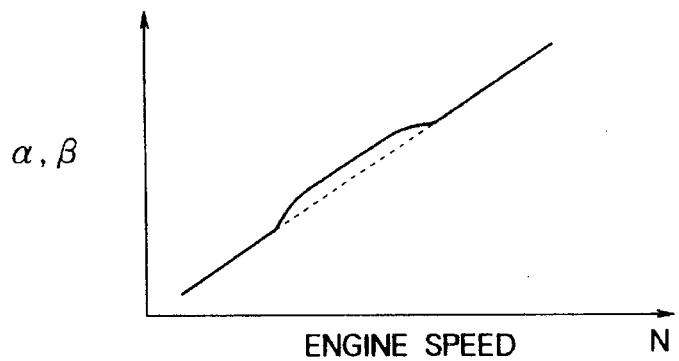
FIG. 26 is a view showing characteristics of coefficients α and β for the engine speeds.
Figure 27:
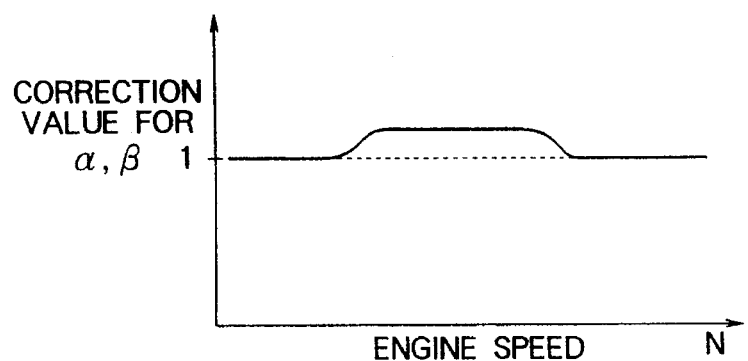
FIG. 27 is a view showing corrections of the coefficients α and β for the engine speeds.

The gradient $\alpha$ and the offset $\beta$ values indicated in FIGS. 20 and 21 do not exactly change along a linear function. In actual, these values change according to any specific engine speeds N as shown in FIG. 26. Hence, to obtain a more exact air flow into the cylinder, it is desirous to correct these $\alpha$ and β values at any specific engine speeds N. As a method for correcting these α and β values, there has been proposed a method for multiplying these α and β values by a correction value of 1 or more at an area of any specific engine speeds as indicated in FIG. 27. In place, the method for subtracting the corrections from these α and β values may be used. These correction values are stored in the memory. In place of directly correcting these α and β, the values of γ, δ, ε and ζ may be corrected at any specific engine speeds. This correction leads to correcting these α and β at a specific engine speeds. In this case, the characteristic of these correction values are likewise to those shown in FIG. 27.

Figure 28A:
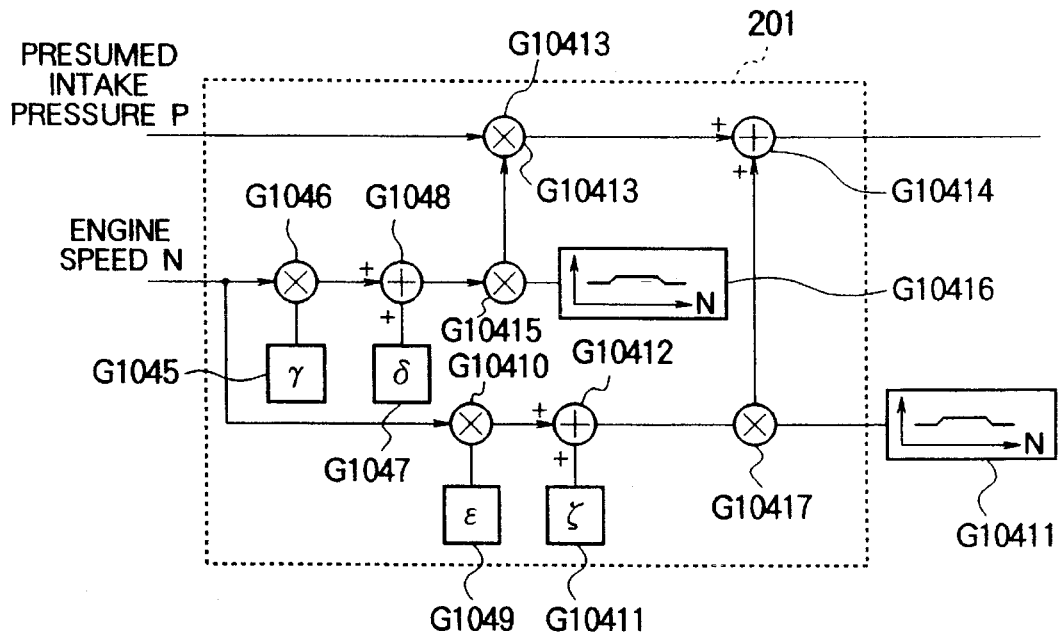
FIGS. 28A and 28B are block diagrams showing another arrangement of a unit for deriving an air flow into the cylinder rather than the arrangement shown in FIG. 1.

FIG. 28A shows a circuit for correcting these α, and β according to the characteristic of FIG. 27. The circuit is basically likewise to the circuit of FIG. 22, except that the outputs of the blocks G1048 and G10412 are connected to multiplier circuits G10415 and G10417, respectively. In addition, G10416 and G10418 denote tables for indicating correction values according to the engine speed N stored in the corresponding memories.

Figure 28B:
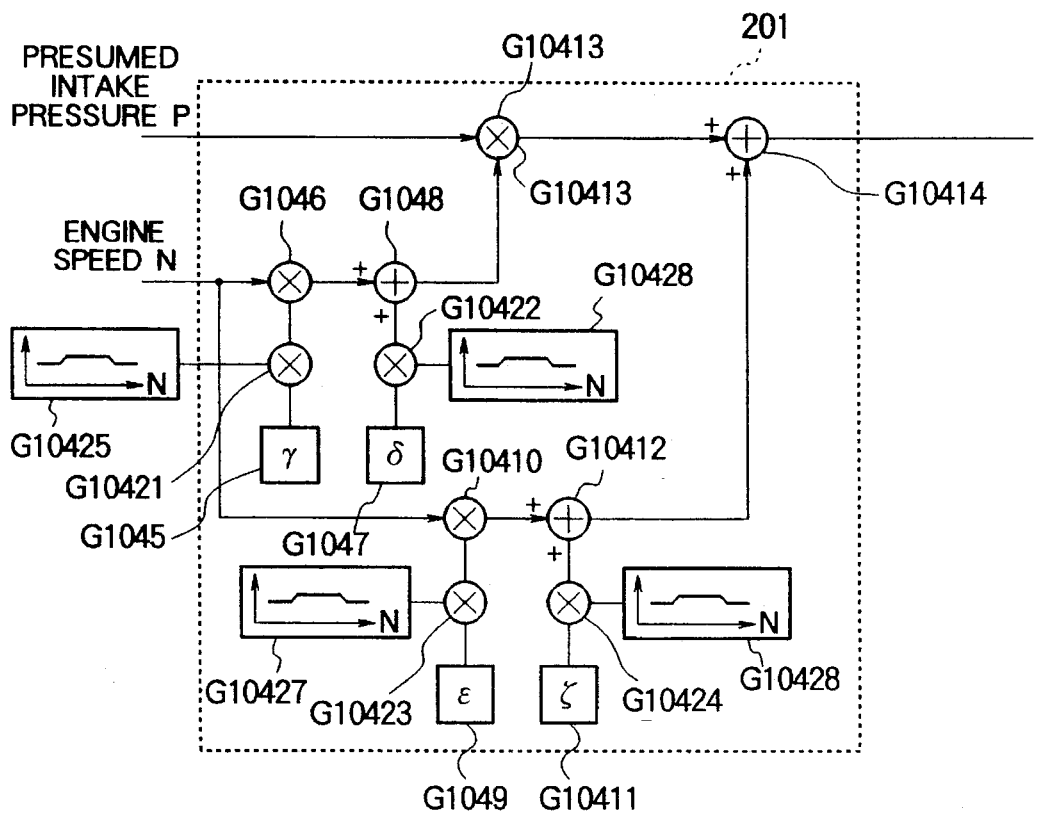

FIG. 28B shows a circuit for correcting the values of γ, δ, ε and ζ according to the characteristic of FIG. 27. This circuit is basically likewise to the circuit of FIG. 22, except that the outputs of the blocks G1045, G1047, G1049 and G10411 are connected to multiplier circuits G10421, G10422, G10423 and G10424, respectively. In addition, G10425, G10426, G10427 and G10428 denote tables for indicating the correction values according to the engine speed N stored in the corresponding memories.

In the foregoing illustrative embodiments, the intake air flow is measured by the HW air flow meter 202. The present invention permits another type of air flow meter to be used for the throttle air flow sensing device for measuring the intake air flow. In this case, no rebound phenomenon takes place in the output. Hence, it is not necessary to provide the throttle air flow correcting unit 102 and the throttle air flow correcting calculating unit 105.

Figure 29:
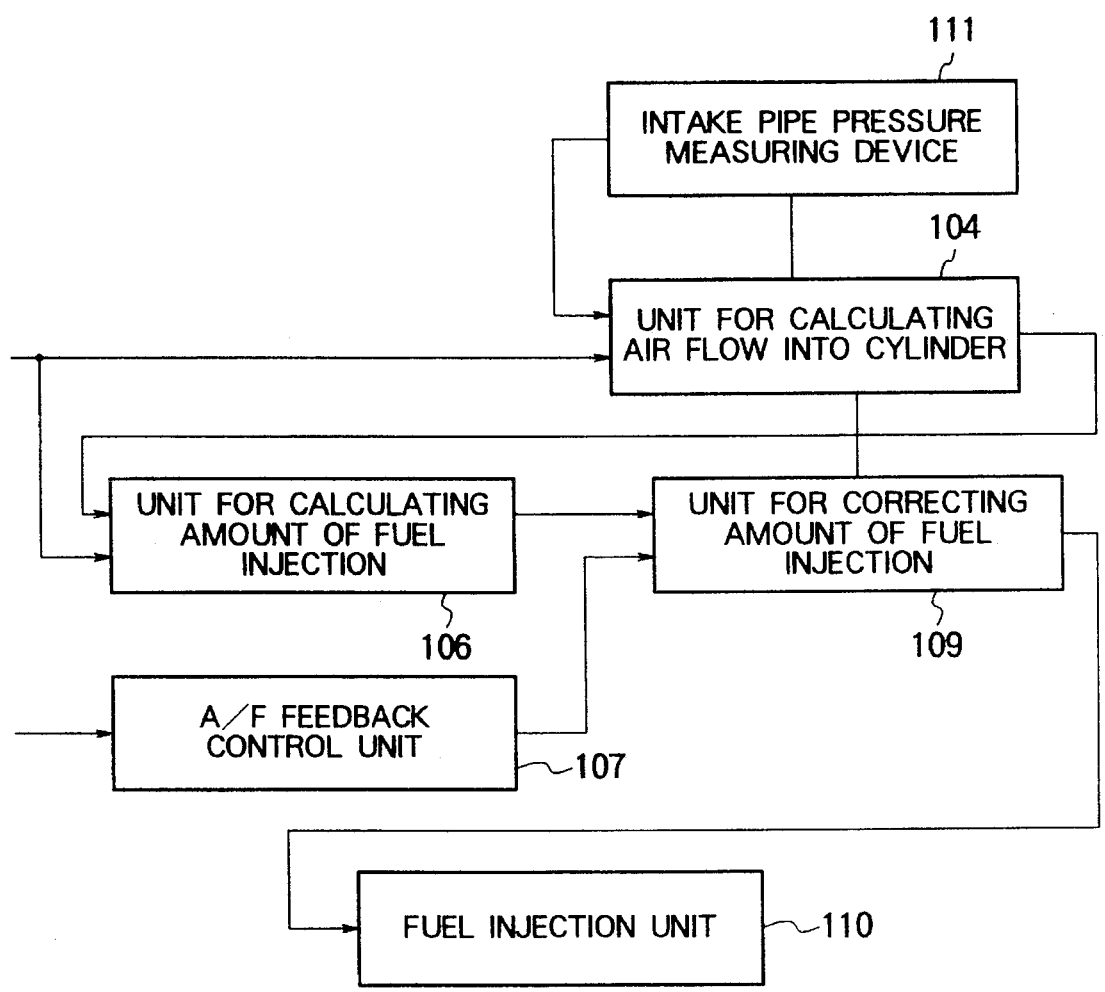
FIG. 29 is a block diagram showing an apparatus for controlling fuel according to another embodiment of the invention.

In place of presuming the pressure of the intake pipe by calculation, the pressure sensor 204 is used for measuring the actual pressure of the intake pipe. The actually measured pressure of the intake pipe may be used for deriving the air flow into the cylinder. In this case, it is not necessary to provide the throttle air flow sensing device 101, the throttle air flow correcting unit 102, and the throttle air flow correcting unit 105. FIG. 29 is a block diagram showing a fuel control system according to another embodiment of the present invention, in which figure the same function blocks as those shown in FIG. 1 have the same reference numbers. An intake pipe pressure measuring device 111 is a sensor for measuring a pressure of the intake pipe provided in a surge tank 210. The signal corresponding to the output value of the pressure sensor 210 is used in place of the presumed pressure of the intake pipe for defining the air flow into the cylinder. The functions of the other blocks are the same as those shown in FIG. 1. Hence, the description about those blocks is not left out here.

FIG. 30 is a flowchart showing the process done in the embodiment of FIG. 20. The process is executed by the microcomputer. In FIG. 30, the same process is executed at the steps having the same reference numbers as those shown in FIG. 1. At a step B111, the output of the pressure sensor 202 is read for defining the pressure of the intake pipe. The processes at the other steps is the same as those shown in FIG. 3. Hence, the description about those processes is left out here.

The embodiments of the invention have been discussed above in detail. The present invention is not limited to the foregoing illustrative embodiments. The invention may be modified into various forms without having to depart from the spirit of the invention.

For example, the embodiment shown in FIG. 3 is arranged to have a digital operating device. In place, it goes without saying that the analog operating device may be used.

Further, the embodiment shown in FIG. 9 is arranged to subtract the throttle air flow correction calculated by the throttle air flow correction calculating means from the measured value. In place, the correction may be added for correcting the value.

As will be understood from the above description, the present invention may reduce the storage volume to be provided in the internal combustion engine. Further, the exact air flow into the cylinder may be obtained with no adverse effect given by the rebound phenomenon of the thermal type air flow meter.

What is claimed is:

1. A method for sensing an air flow into a cylinder of an internal combustion engine, comprising the steps of:

determining a number of revolutions of said internal combustion engine;

determining a pressure of an intake pipe of said internal combustion engine and deriving an air flow Qc into the cylinder of said internal combustion engine by the following linear expression, based on said number of revolutions and said pressure of the intake pipe;

whereby said linear expression is;

$$Qc = \alpha P + \beta$$

in which α is a coefficient indicating a gradient of the linear expression and defined according to said number of revolutions, β is a coefficient indicating an offset value of the linear expression and defined according to said number of revolutions, and P is a pressure value of said intake pipe.

2. A method as claimed in claim 1, wherein said α and β are determined by referring to maps indicating the values of α and β for the number of revolutions stored in a storage unit.

3. A method as claimed in claim 1, wherein the values of α and β are derived by the following linear expressions of $$\alpha = \gamma N + \gamma$$

$$\beta = \epsilon N + \zeta$$

in which γ and ε are coefficients indicating gradients of said linear expressions and defined according to said number of revolutions, δ and ζ are coefficients indicating offset values of said linear expressions and defined according to said number of revolutions, and N is the number of revolutions.

4. A method as claimed in claim 2, wherein the values of α and β are corrected by correcting coefficients derived according to the number of revolutions.

5. A method as claimed in claim 3, wherein the values of γ, ε, δ and ζ are corrected by correcting coefficients derived according to the number of revolutions.

6. A method as claimed in claim 1, further comprising the steps of measuring an air flow to be passed through a throttle valve of said internal combustion engine; and presuming the pressure of said intake pipe based on said throttle air flow.

7. A method as claimed in claim 6, wherein an air flow passed through the throttle of said internal combustion engine is measured by using a thermal type air flow meter.

8. A method as claimed in claim 7, further comprising a step of correcting an air flow to be passed through the throttle of said internal combustion engine by correcting coefficients derived according to the number of revolutions and the pressure of said intake pipe.

9. A method as claimed in claim 8, wherein said correcting coefficients are determined by referring to a map indicating said correcting coefficients for the number of revolutions of the pressure of said intake pipe stored in a storage unit, and said correcting coefficients are added to the measured throttle air flow for correcting said measured air flow.

10. A method as claimed in claim 8, wherein said correcting coefficients are determined by referring to a map for indicating said correcting coefficients for the number of revolutions and the pressure of said intake pipe stored in the storage unit, and said correcting coefficients are multiplied by said measured throttle air flow for correcting said measured air flow.

11. A method as claimed in claim 6, wherein the air flow to be passed through said throttle of said internal combustion engine is determined by referring to a map for indicating a throttle air flow for an aperture of said throttle and said number of revolutions.

12. A method as claimed in claim 1, wherein the pressure of said intake pipe is measured by a pressure sensor within said intake pipe of said internal combustion engine.

13. A method as claimed in claim 6, wherein the pressure of said intake pipe is determined on the difference between said throttle air flow and said derived air flow into the cylinder.

14. A method for controlling fuel of an internal combustion engine, comprising the steps of:

determining a number of revolutions of said internal combustion engine;

determining a pressure of an intake pipe of said internal combustion engine;

deriving an air flow Qc into a cylinder of said internal combustion engine, based on said number of revolutions and said pressure of said intake pipe, by the following linear expression of $Qc=\alpha P+\beta$ wherein $\alpha$ is a coefficient indicating a gradient of said linear expression and defined according to said number of revolutions, $\beta$ is an offset value of said linear expression and defined according to said number of revolutions, and P is the pressure of said intake pipe;

determining a fuel flow signal according to said derived air flow into the cylinder; and feeding to said internal combustion engine fuel at the flow rate defined according to said fuel flow signal.

15. A device for sensing an air flow into a cylinder of an internal combustion engine, comprising:

means for determining a number of revolutions of said internal combustion engine;

means for determining a pressure of an intake pipe of said internal combustion engine; and means for calculating an air flow Qc into a cylinder of said internal combustion engine, based on said number of revolutions and said pressure of the intake pipe, by the following linear expression of $Qc=\alpha P+\beta$ wherein $\alpha$ is a coefficient indicating a gradient of said linear expression and is defined according to said number of revolutions, $\beta$ is a coefficient indicating an offset value of said linear expression and is defined according to said number of revolutions, and P is the pressure of said intake pipe.

16. A device as claimed in claim 15 further comprising a storage unit for storing maps indicating said $\alpha$ and $\beta$ values for the number of revolutions stored in said storage unit, and wherein said calculating means operates to define said $\alpha$ and $\beta$ values by referring to said map.

17. A device as claimed in claim 15, wherein said calculating means operates to calculate said $\alpha$ and $\beta$ values by the following linear expressions of $\alpha=\gamma N+\delta$ $b=\epsilon N+\zeta$ in which g and e are coefficients indicating gradients of said linear expressions and defined according to said number of revolutions, $\delta$ and $\zeta$ are coefficients indicating offset values of said linear expressions and defined according to said number of revolutions, and N is a number of revolutions.

18. A device as claimed in claim 16, wherein said calculating means includes means for correcting said $\alpha$ and $\beta$ values by using correcting coefficients derived according to the number of revolutions.

19. A device as claimed in claim 17, wherein said calculating means includes means for correcting said $\gamma$, $\epsilon$, $\delta$ and $\zeta$ values by correcting coefficients derived according to said number of revolutions.

20. A device as claimed in claim 15, further comprising a thermal type air flow meter for measuring an air flow to be passed through a throttle of said internal combustion engine and wherein means for determining the pressure of said intake pipe presumes the pressure of said intake pipe based on said throttle air flow.

21. A device as claimed in claim 20, further comprising means for correcting an air flow to be passed through the throttle of said internal combustion engine by using correcting coefficients derived according to said number of revolutions and said pressure of said intake pipe.

22. A device as claimed in claim 21, further comprising a storage unit for storing a map indicating said correcting coefficients for said number of revolutions and said pressure of said intake pipe, and wherein said correcting means operates to determine said correcting coefficients by referring to said map if values are given as said number of revolutions and said pressure of said intake pipe and add said correcting coefficients to said measured throttle air flow value for correcting said measured air flow value.

23. A device as claimed in claim 21, further comprising a storage unit for storing a map indicating said correcting coefficients for said number of revolutions and said pressure of said intake pipe, and wherein said correcting means operates to determine said correcting coefficients by referring to said map if values are given as said number of revolutions and said pressure of said intake pipe and multiply said correcting coefficients by said measured throttle air flow value for correcting said measured air flow value.

24. A device as claimed in claim 15, further comprising means for measuring an air flow to be passed through a throttle of said internal combustion engine and means for presuming said pressure of said intake pipe based on said throttle air flow, and wherein means for measuring an air flow being passed through said throttle includes a throttle sensor for sensing an opening degree of said throttle and a storage unit, said storage unit stores a map indicating a throttle air flow for said number of revolutions, and means for measuring said throttle air flow operates to determine said throttle air flow by referring to said map if values are given as said throttle opening degree and said number of revolutions.

25. A device as claimed in claim 15, further comprising a pressure sensor for measuring a pressure of said intake pipe provided in said internal combustion engine.

26. A device as claimed in claim 24, wherein means for determining said pressure of said intake pipe operates to determine said pressure based on a difference between said throttle air flow and said calculated air flow into the cylinder.

27. A device as claimed in claim 25, wherein means for determining said pressure of said intake pipe operates to determine said pressure based on a difference between said throttle air flow and said calculated air flow into the cylinder.

28. A device for controlling fuel of an internal combustion engine, comprising the steps of:

> means for measuring a number of revolutions;
> means for determining a pressure of an intake pipe of said internal combustion engine;
> means for calculating an air flow Qc into a cylinder of said internal combustion engine, based on said number of revolutions and said pressure of said intake pipe, by the following linear expression of $$Qc = \alpha P + \beta$$

wherein $\alpha$ is a coefficient indicating a gradient of said linear expression and defined according to said number of revolutions, $\beta$ is a coefficient indicating an offset value of said linear expression and defined according to said number of revolutions, and P is a pressure of said intake pipe, > means for determining a fuel flow signal according to said calculated air flow into said cylinder; and
> means for feeding to said internal combustion engine a fuel flow according to said fuel flow signal.

* * * * *